United States Patent
Ofodu et al.

(10) Patent No.: US 12,507,715 B2
(45) Date of Patent: Dec. 30, 2025

(54) SWEET TASTING STARCH-DERIVED BEVERAGE AND METHOD OF MAKING

(71) Applicant: Heineken Supply Chain B.V., Zoeterwoude (NL)

(72) Inventors: Ikechukwu Victor Ofodu, Zoeterwoude (NL); August Cornelius Aldegonde Petrus Albert Bekkers, Zoeterwoude (NL)

(73) Assignee: HEINEKEN SUPPLY CHAIN B.V., Zoeterwoude (NL)

(*) Notice: Subject to any disclaimer, the term of this patent is extended or adjusted under 35 U.S.C. 154(b) by 604 days.

(21) Appl. No.: 17/581,037

(22) Filed: Jan. 21, 2022

(65) Prior Publication Data

US 2022/0142206 A1 May 12, 2022

Related U.S. Application Data

(63) Continuation of application No. PCT/EP2020/070847, filed on Jul. 23, 2020.

(30) Foreign Application Priority Data

Jul. 23, 2019 (EP) .................................... 19187830

(51) Int. Cl.
  *A23L 2/38* (2021.01)
  *A23L 2/60* (2006.01)

(52) U.S. Cl.
  CPC .................. *A23L 2/38* (2013.01); *A23L 2/60* (2013.01); *A23V 2002/00* (2013.01)

(58) Field of Classification Search
  None
  See application file for complete search history.

(56) References Cited

U.S. PATENT DOCUMENTS

| | | |
|---|---|---|
| 4,765,993 A | 8/1988 | Owades |
| 5,618,572 A | 4/1997 | Tripp et al. |
| 2015/0017282 A1 | 1/2015 | Fredriksen et al. |

OTHER PUBLICATIONS

Niels Bindesboll Nielsen et al: "The fate of carbohydrates during fermentation of low calorie beer," Carlsberg Research Communications., vol. 50, No. 6, Nov. 1, 1985, pp. 325-332.
International Search Report and Written Opinion on PCT/EP2020/070847 mailed Oct. 1, 2020.

*Primary Examiner* — Lien T Tran
(74) *Attorney, Agent, or Firm* — Foley & Lardner LLP

(57) ABSTRACT

The invention relates to a starch-derived beverage comprising 4-20 wt. % carbohydrates, said beverage containing, calculated by weight of carbohydrates:
  5-65 wt. % of glucose;
  0-65 wt. % of fructose;
  0-50 wt. % of sucrose;
  0.1-30 wt. % of maltose;
  0.03-8 wt. % of maltotriose;
  3-35 wt. % of oligoglucose having a degree of polymerisation in the range of 4-10;
  wherein the combination of glucose and fructose constitutes at least 20 wt. % of the carbohydrates.

The beverage according to the invention is similar to existing non-fermented malt beverages, such as "Malta", except that similar sweetness is achieved with a lower carbohydrate content.

The invention further relates to a process of producing the aforementioned beverage.

15 Claims, No Drawings

SWEET TASTING STARCH-DERIVED BEVERAGE AND METHOD OF MAKING

CROSS-REFERENCE TO RELATED APPLICATIONS

The present application is a Continuation of International Patent Application No. PCT/EP2020/070847, filed Jul. 23, 2020, which claims priority to European Patent Application No. 19187830.5 filed Jul. 23, 2019; the entire contents of all of which are hereby incorporated by reference.

TECHNICAL FIELD OF THE INVENTION

The present invention relates to a non-alcoholic sweet tasting starch-derived beverage. More particularly, the invention relates to such a beverage that has been produced by a process that involves adjustment of the carbohydrate composition of the beverage by treatment with glucoamylase and/or alpha-glucosidase.

BACKGROUND OF THE INVENTION

"Malta" is an example of a sweet tasting starch-derived beverage that is very popular in the Caribbean. Malta is a lightly carbonated non-fermented malt beverage, brewed from barley, hops, water and optionally further ingredients, much like beer; sugar and caramel colour may also be added. Unlike beer, Malta is non-alcoholic. It has a strong malt smell and flavour, its colour is similar to stout (dark brown), and it is generally described as tasting like molasses or rye bread. Ice is often added to a Malta when consumed. Non-fermented malt beverages similar to Malta are also very popular in Africa and in some Central and South American countries.

In the production of non-fermented malt beverages such as Malta, starch provided by grains is converted to sugars in a process called mashing. During mashing the starch is hydrolysed, yielding glucose (monosaccharide), maltose (disaccharide), maltotriose (trisaccharide) and oligoglucose units. Glucose, maltose and maltotriose contribute to the sweetness of the final product. The oligosucrose units provide 'thickness' and thus affect the mouthfeel of the beverage. Once the mashing is completed, the mash is filtered and the mash extract so obtained (wort) is boiled and typically caramel, hop extract and sugar are added. After cooling, the beverage so obtained is packaged in a sealed container.

A typical sugar content of non-alcoholic malt drinks like Malta is around 105 g/L, including around 50 g/L of added sugar. Although the sugars released from the starch during mashing afford sweetness, extra sugar is added in the form of sucrose or inverted sugar syrup or other sweeteners like glucose or fructose syrups so as to achieve the level of sweetness that is appreciated by consumers.

Due to increasing health concerns there is a trend to reduce the amount of added sugar in foods and beverages. A problem associated with the reduction of sugar content is the loss of (desirable) sweetness. A solution for this problem is to add non-nutritive or zero calorie sweeteners such as aspartame or steviol glycosides. However, because sugar does not only provide sweetness but also provides mouthfeel (amongst many other attributes) replacing sugar with non-sugar sweeteners, has an adverse effect on the mouthfeel and the aftertaste of the product. Also from a cost perspective the use of sugar replacers can be unattractive.

U.S. Pat. No. 4,765,993 describes a method for producing an alcohol-free beverage in which a warm malt mash and boiling cereal adjuncts are sequentially blended, boiled, cooled, carbonated, filtered, packaged and pasteurized, and wherein after filtering and prior to packaging an enzyme system comprising one or a mixture of amylolytic enzymes is added to the beverage to convert maltose and complex carbohydrates to dextrose.

U.S. Pat. No. 2015/017282 describes a method of producing a brewer's wort comprising adding to a mash, a glucoamylase that is still active during lautering and has at least 10% residual activity at 80° C.

The present invention aims to overcome one or more of the drawbacks of Malta-type beverages mentioned above.

SUMMARY OF THE INVENTION

The inventors have developed two special processes that enable the production of Malta-like beverages with a reduced total sugars content that are very similar to ordinary Malta beverages in terms of taste, mouthfeel, smell and appearance. More particularly, the inventors have found ways to modify the carbohydrate composition of the wort component in such a way that no or less sugar needs to be added to achieve the desired sweetness in the final beverage.

The process according to the present invention utilises the enzymes glucoamylase and/or alpha-glucosidase. As a result, the carbohydrate profile of the beverage is altered considerably. Compared to a beverage that is produced from an ordinary wort, the monosaccharide content (glucose and/or fructose) of the beverage that is prepared in accordance with the invention is substantially higher, whereas the levels of maltose and/or maltotriose are substantially lower. At the same time, the concentration of oligoglucose in the final beverage is not seriously affected. The present invention offers the advantage that the total sugars content of the beverage can be reduced without significant adverse effect on the quality of the beverage, notably taste and mouthfeel.

Since glucose is a more potent sweetener than either maltose or maltotriose, the glucoamylase treatment with glucoamylase and/or alpha-glucosidase in the present process enhances the sweetness of the final beverage. This sweetness may be further enhanced by converting glucose into fructose, e.g. using glucose isomerase. The enzyme treatment does not seriously affect the mouthfeel and aftertaste of the final beverage as the effect of the treatment on the levels of oligo- and polysaccharides is limited.

The starch-derived beverage of the present invention comprises:
  4-20 wt. % carbohydrates;
  0-1.0 wt. % ethanol; and
  80-95 wt. % water.

The beverage is further characterised in that it contains, calculated by weight of carbohydrates:
  5-65 wt. % of glucose;
  0-65 wt. % of fructose;
  0-50 wt. % of sucrose;
  0.1-30 wt. % of maltose;
  0.03-8 wt. % of maltotriose;
  3-35 wt. % of oligoglucose having a degree of polymerisation in the range of 4-10; and
wherein;
  the combination of glucose and fructose constitutes at least 20 wt. % of the carbohydrates;
  the combination of glucose, fructose and sucrose constitutes at least 40 wt. % of the carbohydrates;

the combination of glucose, fructose, sucrose, maltose, maltotriose and oligoglucose constitutes at least 80 wt. % of the carbohydrates;

$$[glucose]+[fructose]/[maltose]\geq 1.0;$$

[glucose] representing the glucose concentration in wt. %;
[fructose] representing the glucose fructose concentration in wt. %;
[maltose] representing the glucose maltose concentration in wt. %.

The invention also provides a process of producing the aforementioned beverage, said process comprising:
(a) providing a first mash and hydrolysing the starch that is contained in the first mash to produce a first hydrolysed mash;
(b) providing a second mash and hydrolysing the starch that is contained in the second mash in to produce a second hydrolysed mash;
(c) subjecting the second hydrolysed mash to enzymatic hydrolysis using glycosidase selected from glucoamylase, alpha glucosidase and combinations thereof;
wherein the process further comprises:
(d1) combining the glycosidase treated second mash with the hydrolysed first mash to produce a combined hydrolysed mash; and
(e1) filtering the combined hydrolysed mash to produce a wort;
or
(d2) filtering the glycosidase treated second mash to produce a first wort and filtering the second hydrolysed mash to produce a second wort; and
(e2) combining the first wort with the second wort.

In the beverage obtained by this process most of the sweetness is derived from the second hydrolysed mash whereas most of the mouthfeel is derived from the first hydrolysed mash.

The invention further provides a process of producing the beverage according to the present invention, said process comprising:
(a) providing a source of starch;
(b) combining the source of starch with water to produce a mash;
(c) enzymatically hydrolysing the starch that is contained in the mash to produce a hydrolysed mash, said enzymatic hydrolysis being carried out in the presence of amylase selected from alpha-amylase, beta-amylase and combinations thereof and in the presence of glycosidase selected from glucoamylase, alpha glucosidase and combinations thereof;
(d) subjecting the hydrolysed mash to a filtration step to produce a wort;
(e) optionally combining said wort with hops and/or hops extract and/or caramel and/or sugars;
(f) heating the wort to boil for at least 20 minutes.

In this process the hydrolysis step yields a high level of sugars that provide sweetness as well as a significant amount of oligoglucose that provide mouthfeel.

DETAILED DESCRIPTION OF THE INVENTION

Accordingly, a first aspect of the invention relates to a starch-derived beverage comprising:
4-20 wt. % carbohydrates;
0-1.0 wt. % ethanol; and
80-95 wt. % water;
wherein the beverage contains, calculated by weight of carbohydrates:
5-65 wt. % of glucose;
0-65 wt. % of fructose;
0-50 wt. % of sucrose;
0.1-30 wt. % of maltose;
0.03-8 wt. % of maltotriose;
3-35 wt. % of oligoglucose having a degree of polymerisation in the range of 4-10; and
wherein;
the combination of glucose and fructose constitutes at least 20 wt. % of the carbohydrates;
the combination of glucose, fructose and sucrose constitutes at least 40 wt. % of the carbohydrates;
the combination of glucose, fructose, sucrose, maltose, maltotriose and oligoglucose having a degree of polymerisation in the range of 4-10 constitutes at least 80 wt. % of the carbohydrates;

$$[glucose]+[fructose]/[maltose]\geq 1.0;$$

[glucose] representing the glucose concentration in wt. %;
[fructose] representing the glucose fructose concentration in wt. %;
[maltose] representing the glucose maltose concentration in wt. %.

The term "a" or "an" as used herein is defined as "at least one" unless specified otherwise. When referring to a noun (e.g. a compound, an additive, etc.) in the singular, the plural is meant to be included. Thus, when referring to a specific moiety, e.g. "an enzyme", this means "at least one enzyme", unless specified otherwise. The term "or" as used herein is to be understood as "and/or".

The term "carbohydrates" as used herein refers to saccharides, more particularly the term encompasses monosaccharides, disaccharides, trisaccharides, oligosaccharides and polysaccharides.

The term "oligosaccharides" as used herein refers to saccharides that comprises 4-10 monosaccharide units that are joined by glycosidic linkages.

The term "oligoglucose" as used herein refers to an oligosaccharide that is composed of glucose units.

The term "polysaccharide" as used herein refers to saccharides that comprise 11 or more monosaccharide units that are joined by glycosidic linkages.

When referring to a compound of which several isomers exist (e.g. a D and an L enantiomer), the compound in principle includes all enantiomers, diastereomers and cis/trans isomers of that compound.

When an enzyme is identified by reference to an enzyme class (EC), the enzyme class is a class wherein the enzyme is classified or may be classified, on the basis of the Enzyme Nomenclature provided by the Nomenclature Committee of the International Union of Biochemistry and Molecular Biology (NC-IUBMB), which nomenclature may be found at http://www.chem.qmul.ac.uk/iubmb/enzyme/. Other suitable enzymes that have not (yet) been classified in a specified class but may be classified as such, are meant to be included.

The term "glucoamylase" (EC 3.2.1.3) as used herein, also referred to as amyloglucosidase or glucan 1,4-alpha-glucosidase, refers to an enzyme which is capable of catalyzing the hydrolysis of terminal (1→4)-linked α-D-glucose residues successively from non-reducing ends of the chains with release of β-D-glucose.

The term "alpha-glucosidase" (EC 3.2.1.20) as used herein, also referred to as maltase or maltase-glucoamylase, refers to an enzyme which is capable of catalyzing the hydrolysis of terminal, (1→4)-linked α-D-glucose residues with release of α-D-glucose The term "α-amylase" (EC 3.2.1.1) as used herein, refers to an enzyme that catalyzes the hydrolysis of (1-4)-α-D-glucosidic linkages in polysaccharides containing three or more (1-4)-α-linked D-glucose units. The enzyme acts on starch in a random manner, reducing groups are liberated in the α-configuration. It breaks down long-chain saccharides, ultimately yielding maltotriose and maltose from starch. The term "α" relates to the initial anomeric configuration of the free sugar group released and not to the configuration of the linkage hydrolysed.

The term "β-amylase" (EC 3.2.1.2) as used herein, refers to an enzyme that catalyzes the hydrolysis of (1-4)-α-D-glucosidic linkages in polysaccharides so as to remove successive maltose units from the non-reducing ends of the chains. The enzyme acts on starch producing beta-maltose by an inversion. The term "β" relates to the initial anomeric configuration of the free sugar group released and not to the configuration of the linkage hydrolysed.

The term "glucose isomerase" as used herein, refers to an enzyme catalyzing the interconversion of glucose and fructose (EC 5.3.1.18).

The term "non-alcoholic" as used herein, unless indicated otherwise, means that the alcohol content is 1.0% alcohol by volume (ABV) or less.

The term "fermenting" or "fermentation" as used herein refers to contacting wort with live yeast during a period of at least 1 hour.

In the context of the disclosure "total sugars" is defined as the sum of the amounts of mono- and disaccharides.

The concentrations of different carbohydrates can be determined by means of HPLC, e.g. using an ACQUITY UPLC-RI system ex (Waters).

The beverage of the present invention preferably has an alcohol content is 0.8% (ABV) or less, 0.6% (ABV) or less, 0.4% (ABV) or less, 0.3% (ABV) or less, 0.2% (ABV) or less, 0.1% (ABV) or less, or 0.05% (ABV) or less. Most preferably, the beverage contains no alcohol.

As explained herein before, the beverage of the present invention is produced by a process that includes a mashing step in which starch is hydrolysed. The starch is preferably provided by cereal grains. Besides starch, these cereal grains also contain protein. A fraction of this protein typically ends up in the final beverage of the present invention. Accordingly, the beverage preferably contains at least 0.1 mg/L more preferably 0.3-12 mg/L and most preferably 0.8-10 mg/L of cereal grain protein.

In accordance with another preferred embodiment, the beverage is obtained by a process that comprises additions of hops and/or hop extract. Typically, hop or hop extract is added to the filtered mash extract prior to or during a heating step. As a result the beverage typically contains at least 1 mg/L of iso-alpha acids, more preferably 2-20 mg/L of iso-alpha acids and most preferably 3-12 mg/L of iso-alpha acids.

Caramel is another ingredient that is preferably added to the present beverage during its production to give it a characteristic colour. Typically, the beverage measures at least 20 Colour Units EBC, more preferably of at least 60 Colour Units EBC, most preferably of 100-1,000 Colour Units EBC. Colour units EBC (European Brewery Convention) refer to the measured colour of a beer. The EBC method is quantitative and involves measuring the beer sample colour in a cuvette that is placed in a spectrophotometer at a wavelength of 430 nm. The actual formula for measuring color is $EBC=25 \times D \times A_{430}$, where $D$=dilution factor of the sample and $A_{430}$=the light absorbance at 430 nanometers in a 1-cm cuvette. The beverage according to the present invention preferably is a strongly sweet tasting beverage. Preferably, the beverage has a sweetness equivalent to an aqueous solution containing at least 30 grams of sucrose per liter, more preferably a sweetness equivalent to an aqueous solution containing 40-150 grams of sucrose per liter and most preferably a sweetness equivalent to an aqueous solution containing 80-120 grams of sucrose per liter.

The present beverage preferably comprises 5-18 wt. % carbohydrates, more preferably 6-16 wt. % carbohydrates and most preferably 7-15 wt. % carbohydrates.

The combination of glucose, fructose, sucrose, maltose, maltotriose and oligoglucose (DP 4-10) preferably constitutes at least 85 wt. %, more preferably at least 90 wt. % and most preferably at least 95 wt. % of the carbohydrates in the beverage.

The water content of the beverage preferably is in the range of 82-94 wt. %, more preferably in the range of 83-93 wt. % and most preferably in the range of 84-92 wt. %.

The combination of carbohydrates and water typically constitutes at least 95 wt. %, more preferably at least 97 wt. % and most preferably at least 98 wt. % of the beverage of the present invention.

The total sugars content of the present beverage preferably is in the range of 4-15 wt. %, more preferably in the range of 5-13 wt. % and most preferably in the range of 6-12 wt. %.

In a preferred embodiment of the present invention, the beverage contains a very high level of glucose. More particularly, the beverage contains at least 30 wt. % glucose, more preferably at least 40 wt. % glucose and most preferably 50-75 wt. % glucose, calculated by weight of carbohydrates. In accordance with this embodiment, the beverage contain no more than a limited amount of fructose as evidenced by a ratio [glucose]/[fructose] of 6 or more. Most preferably the ratio [glucose]/[fructose] is 10 or more, more preferably at least 12 or more.

In another preferred embodiment, instead of glucose, the beverage contains a high amount of fructose. As explained herein before, glucose may advantageously be converted into fructose to increase the sweetness of the beverage. Such a conversion can be achieved using glucose isomerase (EC 5.3.1.18). Thus, in accordance with this preferred embodiment, the beverage contains at least 20 wt. % fructose, more preferably at least 25 wt. % fructose, even more preferably at least 30 wt. % fructose and most preferably 40-65 wt. % fructose, calculated by weight of carbohydrates. In accordance with this embodiment the ratio [fructose]/[glucose] is 0.5 or more, more preferably said ratio is 0.6 or more, more preferably said ratio is 0.7-1.0.

The combination of glucose and fructose preferably constitutes at least 25 wt. %, more preferably at least 30 wt. % and most preferably 40-75 wt. % of the carbohydrates.

As explained herein before, in the preparation of the present beverage, it is particularly advantageous to convert maltose into glucose as this conversion significantly increased sweetness without increasing total sugars content. Thus, in a preferred embodiment, the maltose content of the beverage does not exceed 24 wt. %, more preferably it does not exceed 20 wt. % and most preferably it does not exceed 15 wt. %, calculated by weight of carbohydrates. Typically, the beverage contains at least 1 wt. % maltose, calculated by weight of carbohydrates.

In a preferred embodiment:

[glucose]+[fructose]/[oligoglucose]≥1.0, preferably
≥1.5, more preferably ≥3

[oligoglucose] representing the oligoglucose concentration in wt. %.

The concentration ratio [glucose]+[fructose]/[maltose] of the present beverage preferably is at least 1.2, more preferably at least 1.4 and most preferably at least 1.5.

The concentration ratio [glucose]+[fructose]/[maltotriose] of the present beverage preferably is at least 3, more preferably at least 4 and most preferably at least 5.

Enzymatic hydrolysis of maltotriose, just like enzymatic hydrolysis of maltose, increases sweetness due to the formation of glucose. If total sugars content is not relevant, enzymatic hydrolysis of maltotriose is advantageous as it increases sweetness. Accordingly in one embodiment, the beverage contains not more than 4 wt. % of maltotriose, more preferably not more than 2 wt. % maltotriose and most preferably not more than 1 wt. % maltotriose, calculated by weight of carbohydrates.

Enzymatic hydrolysis of maltotriose may be undesirable if the total sugars content of the beverage is a concern. Thus, in another preferred embodiment, the beverage contains 4-25 wt. % of maltotriose, more preferably not more than 5-20 wt. % maltotriose and most preferably 6-15 wt. % maltotriose, calculated by weight of carbohydrates.

As explained herein before, the beverage of the present invention preferably contains a substantial amount of oligoglucose as these saccharides contribute to a desirably thick mouthfeel of the beverage. Preferably, the beverage contains 4-32 wt. % of oligoglucose having a degree of polymerization (DP) in the range of 4-10, more preferably 5-25-wt. % of oligoglucose having a DP in the range of 4-10, even more preferably 6-20 wt. % of oligoglucose having a DP in the range of 4-10 and most preferably 7-15 wt. % of oligoglucose having a DP in the range of 4-10, all percentages being calculated by weight of carbohydrates.

In one embodiment of the invention, no sucrose is added to the beverage, in which case the beverage typically contains not more than 2 wt. % sucrose, calculated by weight of carbohydrates.

In another embodiment, sucrose is added to the beverage in order to further sweeten the beverage. Typically, the beverage contains at least 10 wt. % sucrose, calculated by weight of carbohydrates. Due to the treatment with glucoamylase, however, less sucrose is needed to achieve the desired level of sweetness. Preferably, the beverage contains not more than 48 wt. % sucrose, most preferably the beverage contains 20-45 wt. % sucrose, calculated by weight of carbohydrates.

Instead of being sweetened by the addition of sucrose, the present beverage may also be sweetened by the addition of inverted sugar syrup, high fructose syrup and/or glucose syrup (hereinafter referred to as "sugar syrups"). In case the beverage is further sweetened by addition of one or more of these syrups, the beverage typically contains at least 20 wt. % glucose, at least 15 wt. % fructose and at least 60 wt. % of the combination of glucose and fructose, all percentage calculated by weight of carbohydrates.

The combination of glucose, fructose and sucrose preferably constitutes at least 50 wt. %, more preferably at least 60 wt. % and most preferably 70-90 wt. % of the carbohydrates present in the beverage.

The beverage typically has a pH (measured after decarbonation) in the range of 4.0 to 6.0, more preferably a pH in the range of 4.2 to 5.6 and most preferably a pH in the range of 4.3 to 5.4.

According to a particularly preferred embodiment, the beverage of the present invention is packaged in a sealed container. Examples of suitable containers include bottles (glass, PET, etc.), cans, kegs and sachets. Sachets can be used to package non-carbonated beverages.

The beverage of the present invention may be carbonated or non-carbonated. Preferably, the beverage is a carbonated beverage. Typically, the beverage contains 1-12 g/L of $CO_2$, more preferably 2-10 g/L of $CO_2$.

Another aspect of the invention relates to a process of producing a beverage as described herein before, said process comprising:
(a) providing a first mash and hydrolysing the starch that is contained in the first mash to produce a first hydrolysed mash;
(b) providing a second mash and hydrolysing the starch that is contained in the second mash in to produce a second hydrolysed mash;
(c) subjecting the second hydrolysed mash to enzymatic hydrolysis using glycosidase selected from glucoamylase, alpha glucosidase and combinations thereof;
wherein the process further comprises:
(d1) combining the glycosidase treated second mash with the hydrolysed first mash to produce a combined hydrolysed mash; and
(e1) filtering the combined hydrolysed mash to produce a wort;
or
(d2) filtering the glycosidase treated second mash to produce a first wort and filtering the second hydrolysed mash to produce a second wort; and
(e2) combining the first wort with the second wort.

The glycosidase employed in the enzymatic hydrolysis of the second wort preferably is glucoamylase.

The first mash and the enzymatically second hydrolysed mash are preferably combined in a weight ratio, based on dry matter content, of 1:9 to 2:1, more preferably of 1:7 to 1.5:1, most preferably of 1:5 to 1:1.

The first wort and the second wort are preferably combined in a weight ratio, based on dry matter content, of 1:9 to 2:1, more preferably of 1:7 to 1.5:1, most preferably of 1:5 to 1:1.

Fructose is a sugar with a particularly strong sweetness. Since fructose is considerably more sweet than glucose, the sweetness of the final beverage may be enhanced by converting glucose into fructose. This conversion can be catalysed by the enzyme glucose isomerase. Consequently, in a preferred embodiment, the second hydrolysed mash is subjected to enzymatic conversion of glucose to fructose using glucose isomerase The first mash and the second mash may suitably be prepared by providing a source of starch, combining the source of starch with water to produce a mash.

Sources of starch that may be employed include malted grain and unmalted grain. Malted barley is an example of a malted grain that may suitably be used in the present process. Examples of unmalted grains that can be used include barley, rice, wheat, sorghum, corn, rye, oats and combinations thereof. Also tuber crops such as potato and cassava can be used as a source of starch. According to a particularly preferred embodiment, the source of starch employed in the present process includes barley malt.

The production of a mash in accordance with the present invention preferably comprises the milling of cereal grain. Preferably, the cereal grain is milled before it is combined with water to produce the mash.

The first hydrolysed mash preferably comprises 5-18 wt. % carbohydrates, more preferably 6-16 wt. % carbohydrates and most preferably 7-15 wt. % carbohydrates.

The combination of glucose, fructose, sucrose, maltose, maltotriose and oligoglucose (DP 4-10) preferably constitutes at least 85 wt. %, more preferably at least 90 wt. % and most preferably at least 95 wt. % of the carbohydrates in the first hydrolysed mash.

The combination of carbohydrates and water typically constitutes at least 95 wt. %, more preferably at least 97 wt. % and most preferably at least 98 wt. % of the first hydrolysed mash.

In the present process the first hydrolysed mash is the major source of the oligoglucose in the final beverage. Preferably, oligoglucose (DP 4-10) constitutes at least 10 wt. %, more preferably at least 15 wt. %, more preferably at least 30 wt. % and most preferably 40-90 wt. % of the carbohydrates in the first hydrolysed mash.

The combination of glucose and fructose preferably constitutes not more than 15 wt. %, more preferably not more than 10 wt. % and most preferably 0-6 wt. % of the carbohydrates in the first hydrolysed mash.

In a preferred embodiment the carbohydrate composition of the first hydrolysed mash meets the following criterion:

$$[\text{glucose}]+[\text{fructose}]/[\text{oligoglucose}] \leq 1.0, \text{ preferably} \leq 1.5, \text{ more preferably} \leq 0.3$$

[oligoglucose] representing the oligoglucose concentration in wt. %.

The second hydrolysed mash preferably comprises 5-18 wt. % carbohydrates, more preferably 6-16 wt. % carbohydrates and most preferably 7-15 wt. % carbohydrates.

The combination of glucose, fructose, sucrose, maltose, maltotriose and oligoglucose (DP 4-10) preferably constitutes at least 85 wt. %, more preferably at least 90 wt. % and most preferably at least 95 wt. % of the carbohydrates in the second hydrolysed mash.

The combination of carbohydrates and water typically constitutes at least 95 wt. %, more preferably at least 97 wt. % and most preferably at least 98 wt. % of the second hydrolysed mash.

The combination of fructose, glucose, maltose and maltotriose preferably constitutes at least 85 wt. %, more preferably at least 90 wt. % and most preferably 95-100 wt. % of the carbohydrates in the second hydrolysed mash.

In the present process the second hydrolysed mash is the major source of the sweet sugars in the final beverage. Furthermore, the second hydrolysed mash preferably contains a high concentration of the strong sweet tasting sugars fructose, glucose and maltose. Accordingly, in a preferred embodiment, the combination of fructose, glucose and maltose constitutes at least 80 wt. %, more preferably at least 90 wt. % and most preferably 92-100 wt. % of the carbohydrates in the second hydrolysed mash.

According to a particularly preferred embodiment, The combination of glucose and fructose constitutes at least 70 wt. %, more preferably at least 80 wt. % and most preferably 90-100 wt. % of the carbohydrates in the second hydrolysed mash.

As explained above, fructose is more sweet than glucose. Thus, in order to maximise the sweetness contribution of the second hydrolysed wort it is preferred to convert a substantial fraction of the glucose into fructose using, for instance, glucose isomerase. Preferably, fructose constitutes at least 25 wt. %, more preferably at least 30 wt. % and most preferably 35-50 wt. % of the carbohydrates in the second hydrolysed mash.

In a preferred embodiment the carbohydrate composition of the second hydrolysed mash meets the following criterion:

$$[\text{glucose}]+[\text{fructose}]/[\text{oligoglucose}] \geq 5, \text{ preferably} \geq 15, \text{ more preferably} \geq 30$$

[oligoglucose] representing the oligoglucose concentration in wt. %.

Yet another aspect of the present invention relates to a process of producing a beverage as described herein before, said process comprising:
(a) providing a source of starch;
(b) combining the source of starch with water to produce a mash;
(c) enzymatically hydrolysing the starch that is contained in the mash to produce a hydrolysed mash, said enzymatic hydrolysis being carried out in the presence of amylase selected from alpha-amylase, beta-amylase and combinations thereof and in the presence of glycosidase selected from glucoamylase, alpha glucosidase and combinations thereof;
(d) subjecting the hydrolysed mash to a filtration step to produce a wort;
(e) optionally combining said wort with hops and/or hops extract and/or caramel and/or sugars;
(f) heating the wort to boil for at least 20 minutes.

In contrast to the mashing step that is used in the production of yeast fermented beverages, such as beer, the enzymatic hydrolysis of starch in the present process yields a high monosaccharide concentration. In the production of yeast fermented beverages formation of maltose is usually maximised and high levels of glucose and fructose are avoided because such high monosaccharide concentration can have an adverse effect on the yeast by causing osmotic stress.

Sources of starch that may be employed in step a) include malted grain and unmalted grain. Malted barley is an example of a malted grain that may suitably be used in the present process. Examples of unmalted grains that can be used include barley, rice, wheat, sorghum, corn, rye, oats and combinations thereof. Also tuber crops such as potato and cassava can be used as a source of starch. According to a particularly preferred embodiment, the source of starch employed in the present process includes barley malt.

The production of a mash in accordance with the present invention preferably comprises the milling of cereal grain. Preferably, the cereal grain is milled before it is combined with water to produce the mash.

The enzymatic hydrolysis of the starch in the present process is achieved by addition of glycosidase in combination with α-amylase and/or β amylase. The starch degrading enzymes α-amylase and β amylase may suitably be added in the form of malted barley.

Most preferably, the starch is hydrolysed in the presence of α-amylase and β-amylase.

Before enzymatic hydrolysis of the starch commences, the mash typically contains not more than 10 g/L, more preferably not more than 5 g/L of mono- and/or disaccharides.

As the enzymatic hydrolysis proceeds, maltotriose and maltose are formed due to the action of α- and β-amylases and the total amount of sugars gradually increases. Due to the presence of the glycosidase (glucoamylase and/or alpha-glucosidase), at least a part of the maltotriose and/or maltose is further hydrolysed to yield glucose.

The rate at which maltotriose, maltose and glucose are formed in the present process depends inter alia on the temperature, the type of enzyme (e.g. temperature optimum), the amount of enzyme, and the duration of the enzymatic hydrolysis. Preferably, the conditions are selected so that at the end of the enzymatic hydrolysis a substantial part of the starch has been converted into glucose through the combined action of on the one hand α-amylase and/or β-amylases, and on the other hand the glycosidase (glucoamylase and/or alpha-glucosidase). Preferably, the glycosidase employed in the present process is glucoamylase.

Typically, the enzymatic hydrolysis is stopped when at least 50 wt. %, more preferably when at least 60 wt. % of the starch has been converted into saccharides having a degree of polymerisation of less than 4.

The enzymatic hydrolysis of the starch (including gelatinisation and liquefaction) is preferably carried out at a temperature in the range of 45-95° C., more preferably at a temperature in the range of 48-85° C. and most preferably at a temperature in the range of 50-65° C.

In the present process, the glycosidase may be added together with other starch degrading enzymes and/or the glycosidase may be added when the starch degrading enzymes have already digested a part of the starch.

Fructose is a sugar with a particularly strong sweetness. Since fructose is considerably more sweet than glucose, the sweetness of the final beverage may be enhanced by converting glucose into fructose. This conversion can be catalysed by the enzyme glucose isomerase. Consequently, in a preferred embodiment, the starch that is contained in the mash is hydrolysed in the presence of glucose isomerase.

Filtration of the hydrolysed mash serves the purpose of removing undissolved material originating from the source of starch and yields a clarified wort.

In a preferred embodiment, before or during the heating of the wort, hops and/or hop extract are added. Preferably hop or hop extract is added well before the end of the heating period so as to allow for a substantial fraction of the alpha-acids to be converted into iso-alpha acids.

As explained herein before, the sweetness of the final beverage may be increased by adding sucrose and/or sugar syrup. According to a preferred embodiment, sucrose and/or sugar syrup is added after the filtration step, preferably before or during the heating of the wort.

The total amount of sucrose and/or sugar syrup that is added in the present process preferably does not exceed 60 grams per liter of the final beverage, more preferably it does not exceed 50 grams per liter of the final beverage.

In one advantageous embodiment of the present process, no sucrose or sugar syrup is added in the production of the beverage. In this embodiment of the present process enhanced sweetness is achieved by the present process.

In another advantageous embodiment, the present process comprises addition of (a reduced amount of) 10-50 grams of sucrose and/or sugar syrup per liter of the final beverage. More preferably, the process comprises addition of 20-45 grams of sucrose and/or sugar syrup per liter of the final beverage. In this embodiment of the present process the desired sweetness is achieved using less added sugars.

In the present process the wort is preferably heated to boil for at least 40 minutes, more preferably for at least 50 minutes.

After the heating of the wort, the present process may, for example, comprise one or more of the following process steps:

cooling;
maturation;
filtration;
carbonation;
packaging in a sealed container, e.g. a bottle, can or keg.

The present process preferably does not include a fermentation step.

According to a particularly preferred embodiment, the present process comprises the step of packaging the beverage in a sealed container, most preferably a bottle, a can or a keg.

Preferably, the beverage is carbonated before it is packaged in the sealed contained.

The invention is further illustrated by the following non-limiting examples.

EXAMPLES

Example 1

Preparation of Beverage A 20 kg of raw barley (72% extract) was milled and mashed into a cereal cooker with 50 L of brewing water (55° C.) to form a mash. Next, $CaCl_2$ was added to the mash to a concentration that guarantees stability of the enzymes. The pH was then corrected to 5.9 and an established recipe quantity of a commercially available protease was added to the mash to degrade the protein matrix and expose the starch. The mash was then heated up to 50° C. and stirred for 30 mins. Next, an established recipe quantity of a thermostable alpha amylase was added to the mash which was then heated up at a slow and steady rate to 93° C., resulting in a liquefied mash called Stream A.

24.5 kg of barley malt (78% extract) was milled and mashed into a mash tun with 120 L of brewing water (55° C.) to form a mash. Next, $CaCl_2$ was added to the mash to yield a total calcium content that ensures enzyme stability. The mash was stirred for 20 mins, resulting in Stream B.

Stream A was transferred to Stream B to form a new mash with temperature around 62° C. The pH of the mixed mash was then corrected to 5.4 and maintained for 20 min.

Next, the mash was heated to 78° C., filtered, boiled for 60 minutes after addition of hop extract and caramel, clarified and cooled, to result in Beverage A.

Preparation of Beverage 1

20 kg of Raw Barley (72% extract) was milled and mashed into a cereal cooker with 60 L of brewing water (55° C.) to form a mash at 50° C. Next, $CaCl_2$ was added to the mash to yield a total concentration that ensures enzyme stability. The pH was then corrected to 5.9 and an established recipe quantity of a commercially available protease was added to the mash. The mash stirred for 30 min at 50*C. Next, a commercially available thermostable alpha amylase was added at 2.5 times the established recipe quantity to the mash which was heated up at slowly to 93° C. and then maintained for 60 min resulting in a liquefied mash, called Stream A.

24.5 kg of barley malt (78% extract) was milled and mashed into a mash tun with 110 L of brewing water to form a mash at 50° C. Next, $CaCl_2$ was added to the mash to yield a total concentration that guarantees enzyme stability. The mash was allowed stirred for 30 min, resulting in Stream B.

Stream A was then transferred to Stream B to form a mash with temperature around 65° C. and a combined mash pH of 5.2.

After stream combination, the following enzymes were added:

13.4 g of Bioglucanase HAB (a beta glucanase available from Kerry).

31.2 g of Bioferm FA Conc (an alpha amylase available from Kerry); after 75 min, another 15 g this enzyme was added.

53.4 g of Amylo 300 (an amyloglucosidase available from Kerry); after 90 min, an extra 53.4 g was added.

The mash was stirred for 120 min (counting from combining streams A and B), and then the mash was heated to 78° C., and filtered, boiled for 60 minutes after addition of hop extract and caramel, clarified and cooled, to result in a Beverage 1.

Tasting of Beverage A and Beverage 1

Beverage A and Beverage 1 were standardized to 13.4° P and the sugar profile was measured at this gravity, see Table 1.

TABLE 1

|  | g/100 mL | |
| --- | --- | --- |
|  | Beverage A | Beverage 1 |
| Glucose | 1.44 | 6.43 |
| Fructose | 0.28 | 0.3 |
| Sucrose | 0.16 | 0.2 |
| Maltose | 5.02 | 2.74 |
| Maltotriose | 1.66 | 0.08 |
| Sugars ≥ DP4 | 4.84 | 3.65 |
| Total Brix° | 13.4 | 13.4 |

Both beverages were randomly tasted blindly by 7 persons to compare sweetness and mouthfeel qualitatively, see Table 2.

TABLE 2

| Taster 1 | Same mouthfeel as A, but sweeter |
| --- | --- |
| Taster 2 | Same mouthfeel as A, but sweeter |
| Taster 3 | Same mouthfeel as A, but almost 2 times sweeter |
| Taster 4 | Same mouthfeel as A, but sweeter |
| Taster 5 | Same mouthfeel as A, but sweeter |
| Taster 6 | Same mouthfeel as A, but sweeter |
| Taster 7 | Same mouthfeel as A, but sweeter |

Example 2

Beverage A of Example 1 was standardized to 13.4° P, and to an aliquot of 610 mL was added 46 g of sucrose and the resulting mixture was standardized to 12.6° P to give a total sugars content of around 90 g/L. This is Beverage B.

Beverage 1 of Example 1 was standardized to 13.4° P, and to an aliquot of 460 mL 46.7 g of sucrose was added and the resulting mixture was standardized to 11° P to give a total sugars content of around 90 g/L. This is Beverage 2.

Beverage B and beverage 2 were then randomly tasted blindly by 3 expert tasters to compare sweetness and mouthfeel. The results of this evaluation are shown in Table 3.

TABLE 3

|  | Beverage B | Beverage 2 |
| --- | --- | --- |
| Taster 1 | Sweet and balanced | Similar sweetness as B, slight aftertaste, less body |
| Taster 2 | Sweet and balanced | Slightly sweeter than B, less mouthfeel |
| Taster 3 | Sweet with good mouthfeel | Similar to B |

Example 3

Beverage A of Example 1 was standardized to 13.4° P and to an aliquot of 360 ml, 240 ppm of Omega Reb A (a Stevia based sweetener available from Tate & Lyle) was added, following which the mixture was standardised to 1 L to arrive at a total sugars content of 25 g/L. This is Beverage C.

Beverage 1 of Example 1 was standardized to 13.4° P and to an aliquot of 260 mL, 240 ppm of Omega Reb A was added, following which the mixture was standardized to 1 L to arrive at a total sugars content of 25 g/L. This is Beverage 3.

Beverage C and 3 were then randomly tasted blindly by 3 expert tasters to compare sweetness and mouthfeel. The results of this evaluation are shown in Table 4.

TABLE 4

|  | Beverage C | Beverage 3 |
| --- | --- | --- |
| Taster 1 | Light sweetness, liquorice aftertaste | Slightly sweeter than C, same aftertaste |
| Taster 2 | Light with lingering sweetness | Light, maybe slightly sweeter than C, with lingering sweetness |
| Taster 3 | Watery, low sweetness | Watery, slightly sweeter than C |

Example 4

Preparation of the First Wort

Malt was pre-milled using a hammer mill. 160 L of pre-heated water (60° C.) was added to 43 kg of milled malt in the mash tun. The calcium content of the mash was adjusted to 165 mg/L using a $CaCl_2$ solution (33%). After mashing the pH was adjusted to pH 5.6 (±0.1) using hydrochloric acid solution (5%).

The mashing scheme employed was as follows:

a step infusion at 50° C. (15 minutes)

heating to 65° C. in 15 minutes 40 minutes at 65° C.

heating to 78° C. in 10 minutes 10 minutes at 78° C.

Filtration was carried out using a mash filter which consisted of six chambers each with a load of 7.5 kg/chamber. The resulting wort was boiled (100° C., 70 minutes) in the wort copper and the pH was adjusted to 4.8 (±0.1) using HCl (5%). The wort was transferred to the whirlpool for a duration of ten minutes to remove aggregates formed during boiling and to form sweet wort. The wort so obtained was transferred to a cooling tank and is referred to hereinafter as "the first wort".

Preparation of the Second Wort

Two worts were produced in the same way as the first wort, except that different mashing schemes was used.

During the mashing the mashes were treated with amyloglucosidase (Amigase® Mega L, ex DSM Food Specialties B.V., the Netherlands) at either pH 4.5 ('second wort A') or pH 5.4 ('second wort B') to convert maltose and maltotriose into glucose.

The mashing scheme employed was as follows:

a step infusion at 60° C. (20 minutes)

heating to 65° C. in 20 minutes 30 minutes at 65° C.

cooling to 59° C. by adding 19 kg of cold water (5° C.) in 5 minutes adjustment to pH 4.5 or pH 5.4 by adding HCl solution (5%)

addition of the amyloglucosidase (5.2 kg per tonne of grist)

120 minutes at 59° C.

heating to 80° C. in 21 minutes 5 minutes at 80° C.

The mash that had been adjusted to pH 5.4 was subjected to treatment with glucose isomerase (Sweetzyme™, ex Novozymes) to convert glucose into fructose. Before addition of glucose isomerase (10 g/L) the pH of the mash was adjusted to 6.5 using KOH solution (1 M). Next, the mash was incubated at 80° C. for 120 minutes.

The carbohydrate compositions of the first wort and the two second worts are shown in Table 5.

TABLE 5

| | g/100 mL | | |
|---|---|---|---|
| | 1$^{st}$ wort | 2$^{nd}$ wort A | 2$^{nd}$ wort B |
| Glucose | 1.49 | 7.07 | 4.90 |
| Fructose | 0.30 | 0.24 | 5.30 |
| Sucrose | 0.35 | 0.09 | 0.34 |
| Maltose | 6.85 | 0.15 | 0.14 |
| Maltotriose | 1.82 | 0.04 | 0.04 |
| Oligoglucose (DP 4-10) | 1.79 | 0.23 | 0.70 |
| Total Sugars (DP 1-2) | 8.99 | 7.55 | 10.68 |
| Total Carbs (DP 1-10) | 12.60 | 7.82 | 11.42 |
| Brix | 14.95 | 9.99 | 12.50 |

Beverages were produced on the basis of the recipes that are shown in Table 6:

TABLE 6

| | Ref. | A | 1 | 2 | 3 |
|---|---|---|---|---|---|
| 1$^{st}$ wort (% v/v) | 51.0 | 51.0 | 13.0 | 23.0 | 22.0 |
| 2$^{nd}$ wort A (% v/v) | | | | | 27.0 |
| 2$^{nd}$ wort B (% v/v) | | | 25.0 | 21.0 | |
| Sucrose syrup 67 Brix (% w/v) | 6.7 | 4.0 | 5.1 | 5.1 | 6.7 |
| Caramel (% w/v) | 1.3 | 1.3 | 1.3 | 1.3 | 1.3 |
| Water (% v/v) | Make up to 100% volume | | | | |

Ref. Full Sugar Recipe-12.4
A Recipe with 20% total sugars (DP1 + 2) taken out without sweetness compensation
1 Recipe with 20% total sugars (DP1 + 2) taken out and with sweetness and mouthfeel compensation provided by the combination of 1$^{st}$ wort and 2$^{nd}$ wort B (fructose rich wort)
2 Recipe with 15% total sugars (DP1 + 2) taken out and with sweetness and mouthfeel compensation provided by the combination of 1$^{st}$ wort and 2$^{nd}$ wort B (fructose rich wort)
3 Recipe with 6% total sugars (DP1 + 2) taken out and with sweetness and mouthfeel compensation provided by the combination of 1$^{st}$ wort and 2$^{nd}$ wort A (glucose rich wort).

The carbohydrate compositions of these beverages are shown in Table 7.

TABLE 7

| | g/100 mL | | | | |
|---|---|---|---|---|---|
| | Ref. | A | 1 | 2 | 3 |
| Glucose | 0.76 | 0.76 | 1.42 | 1.37 | 2.24 |
| Fructose | 0.15 | 0.15 | 1.36 | 1.18 | 0.13 |
| Sucrose | 4.67 | 2.86 | 3.55 | 3.57 | 4.59 |
| Maltose | 3.52 | 3.52 | 0.95 | 1.63 | 1.57 |
| Maltotriose | 0.93 | 0.93 | 0.25 | 0.43 | 0.41 |
| Oligoglucose (DP 4-10) | 0.91 | 0.91 | 0.41 | 0.56 | 0.46 |
| Total Sugars (DP 1-2) | 9.10 | 7.29 | 7.28 | 7.75 | 8.53 |
| Total Carbs (DP 1-10) | 10.94 | 9.13 | 7.94 | 8.74 | 9.40 |
| Brix | 12.40 | 10.70 | 8.90 | 9.90 | 10.80 |

The sweetness of different carbohydrates can be expressed using the Relative Sweetness (RS) Scale. The RS of a carbohydrate equals the concentration in wt. % at which that carbohydrate produces the equivalent sweet taste sensation as a 10 wt. % sucrose solution, divided by 10. The RS values of carbohydrates present in the aforementioned beverages are listed in Table 8.

TABLE 8

| | RS |
|---|---|
| Glucose | 0.7 |
| Fructose | 1.5 |
| Sucrose | 1.0 |
| Maltose | 0.4 |
| Maltotriose | 0.2 |
| Oligoglucose (DP 4-10) | 0.1 |

On the basis the aforementioned RS values, the relative sweetness of the aforementioned beverages can be calculated ('calculated relative sweetness' or 'CRS'). Furthermore, by dividing the CRS by the % of carbohydrates the relative sweetness contribution provided by the total amount of carbohydrates can calculated. The results of these calculations are shown in Table 9.

TABLE 9

| | Reference | A | 1 | 2 | 3 |
|---|---|---|---|---|---|
| Calculated relative sweetness | 7.1 | 5.3 | 7.1 | 7.1 | 7.1 |
| CRS/% carbohydrates | 0.65 | 0.58 | 0.89 | 0.81 | 0.76 |

Example 5

A beverage according to the present invention combining good taste and mouthfeel with a minimised carbohydrate content can be produced by producing a first hydrolysed mash that contains a high level of oligoglucose and a second hydrolysed mash that contains a high level of fructose and glucose.

As shown in Example 4, an ordinary malta-type beverage (Reference) has a relative sweetness of 7.1, an oligoglucose content of 0.91 wt. % and a total carbohydrate content (DP 1-10) of 10.94 wt. %. To achieve this sweetness a substantial amount of sucrose has to be added.

Table 10 shows the carbohydrate composition of two hypothetical worts, a first wort containing only oligoglucose DP 4-10 and a second wort exclusively containing a 1:1 mixture of fructose and glucose.

A wort having a composition similar to the first wort of Table 10 can be produced by using hydrolytic enzymes that break up the starch in shorter dextrin chains (e.g. endoamylases) rather than removing glucose molecular from the end of the chain, and by ensuring that starch degradation does not proceed to the stage where substantial quantities of maltotriose, maltose and glucose are formed.

A wort having a composition similar to the second wort of Table 10 can be produced by fully hydrolysing the starch so it is completely converted into glucose and by isomerising the glucose by treatment with glucose isomerase to obtain a 1:1 mixture of glucose and fructose.

Table 10 shows the composition of a diluted mixture ('Blend') of the aforementioned two worts that matches the aforementioned reference product in terms of sweetness and oligoglucose content.

TABLE 10

| | g/100 mL | | | |
|---|---|---|---|---|
| | First wort | Second wort | Blend [1] | Reference |
| Glucose | | 5.00 | 3.18 | 0.76 |
| Fructose | | 5.00 | 3.18 | 0.15 |
| Sucrose | | | | 4.67 |
| Maltose | | | | 3.52 |
| Maltotriose | | | | 0.93 |
| Oligoglucose (DP 4-10) | 10.00 | | 0.91 | 0.91 |
| Water | | remainder | | |
| Total carbohydrate (DP 1-10) (g/100 mL) | 10.00 | 10.00 | 7.28 | 10.94 |
| Calculated relative sweetness | 1.0 | 11.00 | 7.1 | 7.1 |
| RS/% carbohydrates | 0.10 | 1.10 | 0.98 | 0.65 |

[1] weight ratio first wort:second wort:water = 9.1:63.7:27.2

From this table it can be concluded that the present invention enables a reduction of carbohydrate content of up to 33 wt. % without significant loss of sweetness and mouthfeel. In addition, it enables the preparation of sweet malta-type beverages without the use of added sucrose.

The invention claimed is:

1. A starch-derived beverage comprising:
    4-20 wt. % carbohydrates;
    0-1.0 wt. % ethanol; and
    80-95 wt. % water;
    wherein the beverage comprises, calculated by weight of carbohydrates:
    5-65 wt. % of glucose;
    0-65 wt. % of fructose;
    0-50 wt. % of sucrose;
    0.1-30 wt. % of maltose;
    0.03-8 wt. % of maltotriose;
    3-35 wt. % of oligoglucose having a degree of polymerisation in the range of 4-10; and
    wherein:
       glucose or the combination of glucose and any fructose constitutes at least 20 wt. % of the carbohydrates;
       glucose; the combination of glucose and any fructose; the combination of glucose and any sucrose; or the combination of glucose and any fructose and sucrose constitutes at least 40 wt. % of the carbohydrates;
       the combination of glucose and any maltose, maltotriose and oligoglucose; the combination of glucose and any fructose, maltose, maltotriose and oligoglucose; the combination of glucose and any sucrose, maltose, maltotriose and oligoglucose; or the combination of glucose and any fructose, sucrose, maltose, maltotriose and oligoglucose constitutes at least 80 wt. % of the carbohydrates;

[glucose]+[fructose]/[maltose]≥1.0;

[glucose] representing the glucose concentration in wt. %;
    [fructose] representing the fructose concentration in wt. %; and
    [maltose] representing the maltose concentration in wt. %.

2. The beverage according to claim 1, wherein the beverage comprises at least 0.1 wt. % of cereal grain protein.

3. The beverage according to claim 1, wherein the beverage comprises at least 1 mg/L of iso-alpha acids.

4. The beverage according to claim 1, wherein:

[glucose]+[fructose]/[oligoglucose]≥1.0; and

[oligoglucose] representing the oligoglucose concentration in wt. %.

5. The beverage according to claim 1, having a sweetness equivalent to an aqueous solution comprising at least 30 grams of sucrose per liter.

6. The beverage according to claim 1, wherein the beverage comprises 5-11 wt. % carbohydrates.

7. The beverage according to claim 1, wherein the beverage comprises at least 30 wt. % glucose, calculated by weight of carbohydrates, and wherein [glucose]/[fructose] ≥6.

8. The beverage according to claim 1, wherein the beverage comprises at least 20 wt. % fructose, calculated by weight of carbohydrates, and wherein [fructose]/[glucose] ≥0.5.

9. The beverage according to claim 1, wherein the beverage comprises not more than 24 wt. % of maltose, calculated by weight of carbohydrates.

10. The beverage according to claim 1, wherein the beverage comprises at least 10 wt. % sucrose, calculated by weight of carbohydrates.

11. The beverage according to claim 1, wherein the beverage is packaged in a sealed container.

12. A process of producing a beverage according to claim 1, the process comprising:
    (a) providing a first mash and hydrolysing starch that is contained in the first mash to produce a hydrolysed first mash;
    (b) providing a second mash and hydrolysing starch that is contained in the second mash using glycosidase selected from glucoamylase, alpha glucosidase and combinations thereof to produce a glycosidase treated second mash;
    wherein the process further comprises:
       (c1) combining the glycosidase treated second mash with the hydrolysed first mash to produce a combined hydrolysed mash; and
       (d1) filtering the combined hydrolysed mash to produce a wort; or
       (c2) filtering the glycosidase treated second mash to produce a first wort and filtering the hydrolysed first mash to produce a second wort; and
       (d2) combining the first wort with the second wort;
    (e) providing a beverage comprising the wort of step (d1) or the combined first wort and second wort of step (d2).

13. The process according to claim 12, wherein the glycosidase is glucoamylase.

14. The process according to claim 12, wherein the hydrolysing of step (a) and step (b) is in the presence of an amylase selected from alpha-amylase, beta-amylase and combinations thereof.

15. The process according to claim 12, wherein the hydrolysed second mash is subjected to enzymatic conversion of glucose to fructose using glucose isomerase.

* * * * *